United States Patent
Boebel

(10) Patent No.: US 8,408,955 B2
(45) Date of Patent: Apr. 2, 2013

(54) MOUNTING FOR AN OUTBOARD ENGINE

(75) Inventor: Friedrich Boebel, Eurasburg (DE)

(73) Assignee: Torqeedo GmbH, Starnberg (DE)

( * ) Notice: Subject to any disclaimer, the term of this patent is extended or adjusted under 35 U.S.C. 154(b) by 123 days.

(21) Appl. No.: 12/503,524

(22) Filed: Jul. 15, 2009

(65) Prior Publication Data
US 2010/0012814 A1 Jan. 21, 2010

(30) Foreign Application Priority Data

Jul. 16, 2008 (DE) .......................... 10 2008 033 387
Aug. 12, 2008 (EP) ..................................... 08014390

(51) Int. Cl.
*B63H 20/08* (2006.01)
(52) U.S. Cl. ........... 440/53; 248/640; 248/642; 248/643
(58) Field of Classification Search .................. 114/347; 248/640, 641, 642, 643; 403/90, 128; 440/6, 440/53, 56, 65
See application file for complete search history.

(56) References Cited

U.S. PATENT DOCUMENTS

| | | | |
|---|---|---|---|
| 1,455,441 A * | 5/1923 | La Hodny | 248/484 |
| 1,894,710 A * | 1/1933 | Samuelson | 248/641 |
| 3,674,228 A | 7/1972 | Horton | |
| 4,482,332 A * | 11/1984 | Emmons | 440/53 |
| 4,597,354 A | 7/1986 | Gelula | |
| 4,704,043 A * | 11/1987 | Hackman et al. | 403/90 |
| 5,846,015 A * | 12/1998 | Mononen | 403/90 |
| 6,220,556 B1 | 4/2001 | Sohrt et al. | |
| 6,390,866 B1 | 5/2002 | Nystrom | |
| 6,394,408 B1 | 5/2002 | Henderson et al. | |
| 6,672,788 B2 * | 1/2004 | Hathaway | 403/90 |
| 6,767,153 B1 * | 7/2004 | Holbrook | 403/90 |
| 7,090,181 B2 * | 8/2006 | Biba et al. | 248/288.31 |
| 2006/0011795 A1 | 1/2006 | Dobbins | |

FOREIGN PATENT DOCUMENTS

EP 1 158 238 A1 11/2001

OTHER PUBLICATIONS

European Search Report dated Sep. 17, 2009 w/partial English translation (five (5) pages).
European Search Report dated Nov. 26, 2008 w/partial English translation (eight (8) pages).

* cited by examiner

Primary Examiner — Lars A Olson
(74) Attorney, Agent, or Firm — Crowell & Moring LLP

(57) ABSTRACT

A mounting for fastening an outboard engine on a boat, in particular a kayak, has a support arm with a first fastening element for fastening the support arm on the boat. The first fastening element is a clamping device for receiving and fixing a knob on the boat.

3 Claims, 4 Drawing Sheets

MOUNTING FOR AN OUTBOARD ENGINE

BACKGROUND AND SUMMARY OF THE INVENTION

The present invention relates to a boat, in particular a kayak, with a mounting for fastening an outboard engine to the boat, wherein the mounting comprises a support arm which has a first fastening element for fastening the support arm on the boat. Furthermore, the present invention is directed towards an outboard engine with a mounting, wherein the mounting is provided with a support arm, which has a first fastening element for fastening the support on a boat such as a kayak.

Outboard engines are known drives for boats and are normally attached at the stern of a boat. To this end, the boats are frequently equipped with a so-called transom, that is a substantially vertical rear end plate or tail board, to which the outboard engine is attachable by way of a clamping device.

However this kind of fastening is not suitable for all boat types. Thus for instance boats of low overall height, in particular kayaks, are equipped, not with a transom, but with special individually adapted fastening devices for an outboard engine.

In U.S. Pat. No. 6,394,408, a mounting is disclosed where a support arm is fastened on the deck of the boat, which extends rearwards beyond the stern of the boat and to the rear end of which is attached a holder for the shaft of the outboard engine. The holder can be freely adjusted as regards its alignment.

For kayaks, however, this known mounting can be used only under certain conditions. The shapes of the sterns of different kayak types can vary very distinctly, making it necessary for the fastening of the support arm on the deck of the boat to be adapted, in each case, to the respective design of the stern. If in addition the kayak is equipped with a rudder, there is no way of using the mounting disclosed in said U.S. Pat. No. 6,394,408 if only because of lack of space. The narrow construction of kayaks is such that the outboard engine and the rudder cannot be attached side by side at the rear.

It is therefore an object of the present invention to provide a boat with a mounting, with which an outboard engine can be fastened on the boat, in particular on a kayak, wherein the mounting shall be suitable, as far as possible, for all kinds and constructions of boats.

This objective has been achieved by a boat, in particular a kayak, with a mounting for fastening an outboard engine on the boat, wherein the mounting comprises a support arm which has a first fastening element for attaching the support arm to the boat, and a knob arranged on the boat such that the first fastening element acts as a clamping device for receiving and fixing the knob.

The outboard engine according to the present invention has a mounting which is provided with a support arm which has a first fastening element for fastening the support arm on a boat, in particular on a kayak, wherein the first fastening element is a clamping device for receiving and fixing a knob connected with the boat.

According to the present invention, the outboard engine is fixed to the boat is effected via a support arm which is fastened on the body of the boat by a ball joint consisting of a knob and an appropriate clamping device.

The term "knob" shall mean, in particular, a spherical or polyhedral shape. Preferably the knob is realised as the spherical end of a short distance piece connected to the boat. Instead of a spherical end piece, however, a polyhedron, in particular a regular polyhedron such as a dodecahedron, can be employed. Alternatively, a segment of a sphere or a section of a polyhedron may form the knob according to the invention.

Similarly the term "clamping device" contemplates devices of any kind that allow the support arm to be attached to the knob. The knob and the clamping device together form a kind of ball joint to allow the support arm to be aligned in different directions relative to the boat.

The connection between the clamping device and the knob is preferably a positive one, that is, the cohesion of the connection between clamping device and knob is achieved mainly through the friction force or adherence occurring between the outside surface of the knob and the inside surface of the clamping device. For this reason the inside of the clamping device is shaped to match the surface of the knob so that for a fixed clamping device the friction forces achieved are very high.

It is especially preferable to use a knob which is shaped as a sphere. With a spherical knob the inside surfaces of the clamping device, which come into contact with the knob, will be shaped so as to be concave with substantially the same radius. When shaped in such a way the clamping device with the support arm can be freely aligned in all spatial directions.

Alternatively, the clamping device may be fastened to the knob via a positive connection, namely in that parts of the knob and the clamping device engage with each other. For example, the knob may be provided with several elevations, which engage in corresponding indentations of the clamping device. If the elevations and the corresponding indentations are arranged in a regular fashion, the support arm, also in this case, can be fastened in different orientations relative to the knob or boat.

A positive connection has the advantage that as a rule, the forces to be applied for fixing the clamping device to the knob, need not be as high as for a purely non-positive connection. On the other hand, some drawbacks have to be accepted as regards orientatability of the clamping device and the support arm, since cohesion is only achieved if corresponding parts of the clamping device and the knob properly engage with each other. That is, the clamping device with the support arm must be brought into a certain position relative to the knob, as a rule, into one of several marked positions.

Depending upon the field of application both non-positive and positive connections may be of advantage. Apart from purely non-positive and positive connections it is also contemplated to have connections with positive and non-positive components. The advantage, in all cases however, lies in having a detachable connection.

In the following the term "ball joint" is used to define a joint, where the head of the joint has a shape which is similar to a sphere or knob. The above mentioned combination of clamping device and knob is understood to mean a ball joint in this sense. The ball joint allows alignment of the support arm in many different spatial directions. The mounting for an outboard engine according to the invention can therefore be used for almost all types of boat. Irrespective of the construction of the hull the support arm can be aligned in such a way, that the outboard engine attached to it is immersed in the water in the desired manner. If, for example, the stern is raised or if, vice versa, the top of the boat slopes downwards towards the rear, the support arm can, nevertheless, be fixed to the boat substantially horizontally in relation to the surface of the water.

The drive motor of the outboard engine is normally housed in an underwater body, the so-called pylon. The drive motor drives a drive shaft, which extends out of the pylon via a bushing and which has a propeller attached to it at the end. In a currently preferred embodiment of the invention, the pylon is attached to a shaft which, in turn, is connected to the support arm via a second fastening element.

Alternatively, it is also contemplated to connect the pylon directly to the support arm without providing an intermediate element in the form of a shaft. In this case, it is especially advantageous if the support arm is bent or angled. A direct attachment of the pylon to the support arm without a shaft is, for example, of advantage in cases where the boat has a separate rudder and the outboard engine is used only for forward movement, but not for steering the boat, that is, where the pylon and the propeller remain in a fixed position relative to the boat and are not moved, e.g. for steering.

In a currently preferred embodiment, the distance between the sphere clamping device, i.e. the ball joint, and the second fastening element, can be altered. In an especially preferred variant, both the position of the clamping device relative to the support arm and of the second fastening element relative to the support arm may be adjusted. Thus for example, the clamping device and/or the second fastening element can be moved along the support arm and fixed in different positions. In a similar manner the distance of the outboard engine held by the support arm from the boat may also be adjusted.

Preferably the support arm has a length of between 50 cm and 100 cm, the support arm is constructed as a straight tube or section tube with a round or square cross-section. Or, depending on the amount of space available in and on the boat, it may also be convenient to use an angled support arm or to provide a further joint on the support arm. An angled, curved or bent support arm is especially advantageous, if the pylon, i.e. the underwater body of the outboard engine with the propeller, is directly attached to the support arm.

The fastening of the shaft of the outboard engine on the support arm is preferably effected by way of a clamping device. To this end, the second fastening element comprises two clamping jaws movable in relation to each other. The support arm is positioned between the two clamping jaws. To fix them the clamping jaws may, for example, be moved towards each other via a screw connection and pressed against the support arm.

The second fastening device preferably has a joint which allows the shaft to be moved relative to the support arm in two planes extending perpendicularly in relation to each other. In the following description, such a joint is also called a universal joint.

Preferably two rotary joints are provided, the rotary axes of which are arranged offset by an angle of 90° in relation to each other. The second fastening element is preferably attached to the support arm in such a way that the rotary axis of the first rotary joint is orientated substantially parallel to the surface of the water, when the boat is being used. By rotating the shaft with the pylon of the outboard engine about the first rotary joint the outboard engine can be tilted out of the water.

In order to be able to tilt the outboard engine without any problems, it is favorable to provide a cable pull. It is convenient if for this purpose a lever arm is attached to the outboard engine, which the driver of the boat is able to operate from his normal position in the boat with the help of the cable pull. In particular with kayaks, which are mostly of narrow construction and where the driver can only move with difficulty to another position, this is a good solution for a safe, quick and simple tilting of the outboard engine. The rope preferably passes through one or more lugs or deflection pulleys. Advantageously, the rope is fixed on the boat or kayak via a commonly known rope clamp.

The rotary axis of the second rotary joint of the second fastening device is preferably perpendicularly aligned to the surface of the water, so that during operation the driving direction of the boat can be changed by rotating the outboard engine about this rotary axis.

Many kayaks have a rudder for steering the kayak and keeping it on course. Usually the rudder is operated by foot via a cable pull. If the outboard engine according to the invention is attached to the kayak and can be moved via a rotary joint in such a way that the longitudinal axis of the pylon and the longitudinal axis of the kayak can be brought into different angle positions in relation to each other, i.e. if by rotating the outboard engine the driving direction of the kayak can also be altered, it is advantageous to attach lugs, deflection pulleys and/or similar fastening apparatus for a cable pull on the outboard engine in order to steer the outboard engine by way of the cable pull. An existing steering system such as the above-described foot-operated cable pull steering system, is already used with special advantage in this respect.

The clamping device for fastening the support arm on the knob preferably comprises a first and a second bearing shell, wherein the first bearing shell is firmly connected to the support arm. The second bearing shell is connected with the first bearing shell via a detachable connection resulting in the two bearing shells gripping around the knob attached to the boat and clamping it between them. It is advantageous if the two bearing shells are connected to each other via screws.

Advantageously, the mounting according to the present invention has an extension arm, which on the one hand, is connected to the knob and, on the other hand, to a second fixed point on the boat. The torque applied by the outboard engine and the support arm via the extension arm is not absorbed solely by the knob but also distributed across the second fixed point. Thus the mechanical stress of the fastening of the knob on the boat is substantially reduced.

In order to reduce the forces which come from the outboard engine and which act upon the knob, it is advantageous to provide a bearing on which the support arm is resting. Since during operation the propeller of the outboard engine is under water, while the knob and the support arm attached to the boat are above the water surface, the support arm and the knob are exposed not only to the desired propulsive thrust in longitudinal direction of the boat, but also to shearing forces perpendicular to the surface of the boat. It is also advantageous for the absorption of these forces if the support arm is supported by a bearing between the knob and the edge of the boat. The term "bearing" means here a support element which can absorb at least vertical forces, i.e. forces perpendicular to the water surface. The bearing may be provided also with a holder or a guide for the support arm so that the support arm is fixed also as regards, for example, any forces perpendicular to the longitudinal axis of the same and parallel to the surface of the water or the boat. Finally, it is advantageous if the support arm is fastened to the bearing in such a way that all degrees of freedom of movement of the support arm are fixed. This may be effected, for example, by a suitable restraint for the support arm and attached to it. The bearing is preferably made from plastic, rubber or hard rubber.

The bearing may be merely placed on the boat or fastened on the boat. In the first case, while the boat is in operation, i.e. being driven, the bearing is clamped and held between support arm and boat by the forces from the outboard engine which acts upon the support arm. When the outboard engine is switched off, the bearing lies loosely on the boat and can be quickly removed. It has also become evident that it is favorable to connect the bearing to the boat in such a way that the bearing remains firmly in its position, even if the drive is switched off.

Advantageously, the bearing consists of several elements which can be placed on top of and/or connected with each other. Depending upon the shape of the hull or the top of the boat and depending upon where the support arm is to be supported, bearings of different heights are required. Due to the bearing being constructed in a modular fashion from several elements this may be easily adapted to suit the different requirements.

As already mentioned above the support arm may lie loosely on the bearing or may preferably be attached to the same. Advantageously, the support arm is detachably fastened on the bearing, for example via a restraining device or a screw connection.

The bearing should be attached as closely as possible to the edge of the boat, so that the torque from the outboard engine acting upon the support arm can be optimally absorbed by the bearing. Preferably the distance between the bearing and the edge of the boat in longitudinal direction of the support arm is less than 20 cm. Advantageously, the distance between knob and bearing is larger than the distance between bearing and edge of the boat.

The knob which serves to fasten the support arm on the boat, is advantageously attached to the top of the boat. In principle, however, the knob may also be attached to an external side of the boat if this is necessary or advantageous for reasons of space. Due to the free adjustability and alignment of the support arm in all spatial directions according to the invention the knob may even be attached at a place inside the boat.

If the knob is to be attached to a deck of the boat, i.e. to a deck delimiting the top of the boat, the respective point on the inside or underside of the boat deck, in particular with kayaks, is frequently inaccessible or accessible only with difficulty. Therefore it has been found to be advantageous if the knob is fastened on the hull or a sidewall of the boat by screws and spreading dowels. Holes are drilled through the desired point on the sidewall or the deck of the boat into which spreading dowels or cavity dowels, in particular folding dowels, spring dowels, tilting dowels or metal cavity dowels are inserted. Screws are inserted through respective openings in the carrier plate of the knob into the dowels and tightened. This has the effect of prizing the dowels open and pressing them against the inside wall of the boat. O-rings and other sealing elements may first be placed between carrier plate and sidewall for sealing.

The support arm is preferably aligned in such a way that the outboard engine attached to it is situated behind the boat. Correspondingly, it is advantageous if the knob is arranged at a distance of between 10 and 100 cm away from the stern of the boat. Preferably the knob is attached as closely as possible to the stern in order to be able to keep the support arm short and the torques transmitted via it small. Sometimes, in particular with kayaks with a separate rudder, the outboard engine can be neither fastened nor arranged on the stern because of lack of space. In this case it is favorable or advantageous if the knob is not attached centrally in the rear part of the boat, but laterally offset.

The present invention is especially suited for fastening an outboard engine on a kayak. A currently especially preferred field of application is that directed to sea-going, wandering and touring kayaks. By the term "kayak" are understood both open and closed kayaks, i.e. so-called "sit-on-top kayaks", where the driver or drivers sit on top of the hull of the boat, or "sit-inside kayaks", where the driver or drivers sit in the kayak. Kayaks are, as a rule, made of plastic or wood and designed for one or two persons, sometimes even for up to four persons. Depending upon the field of application kayaks may sometimes differ distinctly from one another as regards their length relative to their width and hull shape. Sea-going kayaks are, for example, long and relatively small with a specially shaped bow and stern. The ends of a sea-going kayak are raised so that they can ride on the waves instead of cutting through them.

Wandering and touring kayaks have a length of between approximately 3.5 m and 5 m and vary in width between 50 and 70 cm. Wandering kayaks offer a lot of stow room in front of and behind the paddler so that longer periods of touring are no problem. Wandering kayaks are normally used on rivers and lakes.

The stern shapes of the different types of kayak can differ very widely. The present invention proposes a mounting for an outboard engine that can be used independently of the construction of the boat and in particular of its stern. The same mounting may be used for the most different types of boat and boat shapes and is particularly suited for outboard engines. The one condition is that the boat must be fitted with a knob according to the invention.

Many sea-going and touring kayaks are fitted with a rudder in order to keep the boat on course. This consists of a steering fin at the stern of the kayak or below the stern which is normally operated by foot via a cable pull. Due to the narrow design of the kayak there is, in this case, usually no room in the area where an outboard engine would normally be attached. The mounting according to the present invention makes it possible to align the support arm in all directions so that the outboard engine can be arranged in a place where the space conditions allow it.

BRIEF DESCRIPTION OF THE DRAWINGS

These and further objects and advantages of the present invention will become more apparently from the following description in conjunction with the accompanying drawings in which.

DETAILED DESCRIPTION OF THE DRAWINGS

Figure 1:
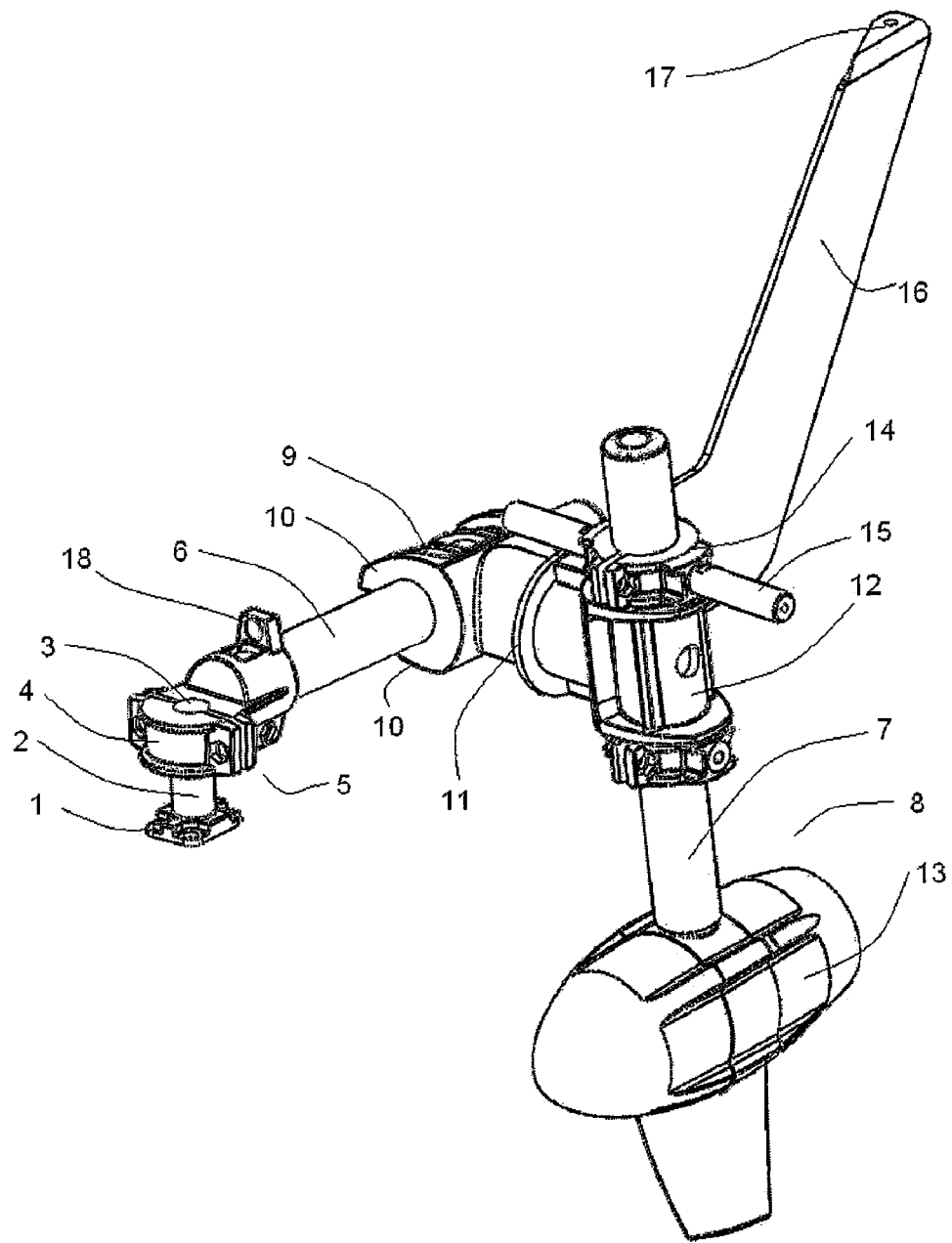
FIG. 1 is a perspective view of a mounting according to the present invention for fastening an outboard engine on a boat, in particular a kayak.

FIG. 1 shows a device for fastening an outboard engine 8 on a boat, in particular a kayak. The outboard engine 8 comprises an underwater body 13, a so-called pylon 13 which houses an electric motor (not shown). The electric motor drives a shaft that passes through the pylon 13 and that has a propeller mounted thereon in a known manner (also not shown). In operation the pylon 13 is held underwater by a shaft 7.

Figure 5:
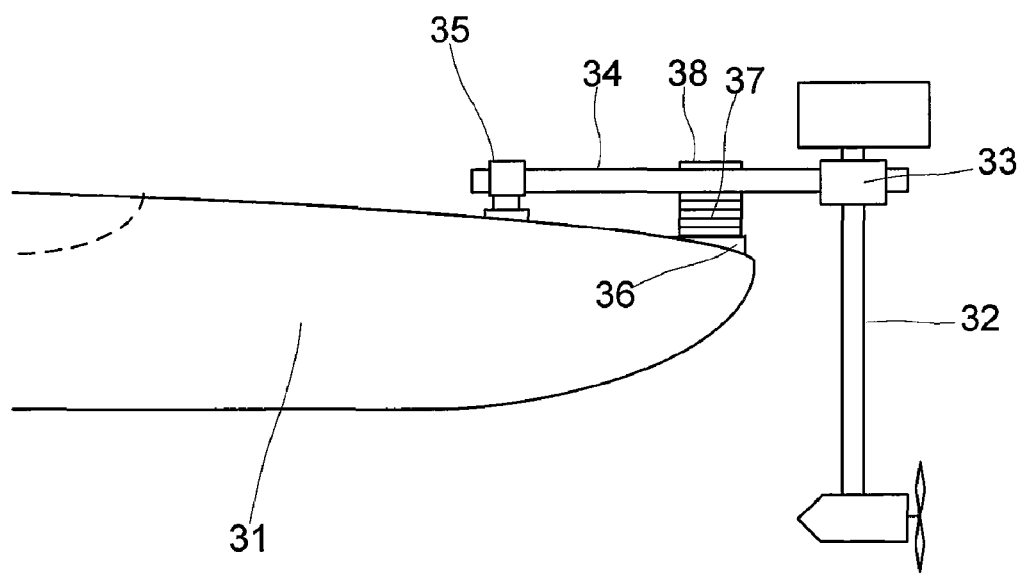
FIG. 5 is a partial elevational view of a kayak according to the present invention with the mounting for the outboard engine.

For better clarity the boat is not shown in FIG. 1 but is shown in FIG. 5. A carrier plate 1 is fastened on the top of the boat 1 by way of spreading dowels which are inserted from above through the deck of the kayak or top of the boat and then prized open by screws. The carrier plate 1 carries a distance or spacer piece 2 of which the end facing away from the carrier plate 1 is provided with a sphere 3.

Figure 4:
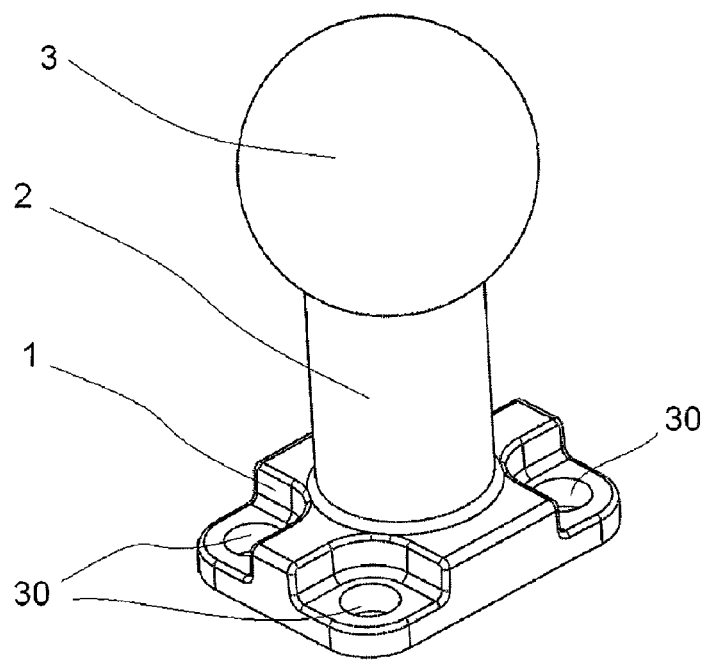
FIG. 4 is a perspective view of a sphere according to the present invention, which is fastened to the boat.

Sphere 3 is illustrated in detail in FIG. 4. Carrier plate 1 has four bores 30 through which screws are inserted and screwed into the spreading or cavity dowels. Commonly used cavity dowels have been found to be particularly suited for this purpose. Proven dowels are folding or tilting dowels, where one or two dowel wings unfold in the cavity or are pried apart by a spring force thus forming a wide support surface on the back of the hollow wall, which in the present case is the kayak deck or top of the boat. Just as favorable are cavity dowels, the longitudinal body of which is divided into several longitudinal segments which open up inside the dowel when the screw is tightened. The distance piece 2 in particular is formed cylindrically and connects the sphere 3 with the carrier plate 1.

The sphere 3, together with a corresponding clamping device 4, which will be described in more detail below, forms a ball joint 5 which carries a support arm 6. The ball joint 5 is movable in all three spatial directions so that the support arm 6 may be aligned in the desired direction and fixed by the clamping device 4.

Shaft 7 of the outboard engine 8 is fastened to the support arm 6 via a second fastening device 9. The second fastening device 9 comprises two clamping jaws 10 for this purpose which grip around the support arm 6 and may be pressed together so as to form a tight connection with the support arm 6. When the two clamping jaws 10 are not pressed together, the second fastening element 9 is movable and rotatable on the support arm 6.

The second fastening element 9 further comprises a tilting joint 11 and a rotary joint 12 the rotary axes of which are orientated perpendicularly to each other and perpendicularly to the support arm 6. Shaft 7 of the outboard engine 8 is rotatably mounted in the rotary joint 12 thereby allowing the outboard engine 8 to be deflected during, for example, cornering. When manoeuvring in shallow waters, the tilting joint 11 may be used to move the outboard engine 8 into a slanting position or tilting it completely out of the water.

Both the ball joint 5 and the second fastening element 9 allow the support arm 5 and the shaft 7 of the outboard engine 8 to be aligned in all sorts of different spatial directions. By an appropriate adjustment of the ball joint 5 and the second fastening element 9 the outboard engine 8 can, for example, always be aligned in such a way that the shaft 7 is orientated vertically.

The shaft 7 is fastened by a kind of pipe clamp 14 to a cross bar 15 which is used to turn the shaft 7 and thus to deflect the outboard engine 8. Lugs are provided on the end of the cross bar 15 to which the cable pulls are fastened, which in other respects are used for steering a rudder. Operation of the cable pulls is effected by the driver via pedals inside the kayak as already known in many kayaks for operating a rudder.

One half of the tilting joint 11, i.e. the half not rigidly but rotatably connected with the second fastening element 9, is provided with a tilting lever 16. By deflecting the tilting lever 16, shaft 7 together with outboard engine 8 is moved, when in operation, from the substantially vertical position into an inclined position. Preferably the tilting lever 16 is also operated via a cable pull.

To this end the tip of the tilting lever 16 has an opening 17 bored into it which is used for attaching the cable pull (not shown). The cable is then guided through a further lug 18 located on the support arm 6 and finally clamped into a rope clamp next to the driver's seat. The kayak driver therefore can without changing his position, tilt the outboard engine 8 upwards by pulling on the cable in order to reduce the kayak's draught for drives in shallow waters, for example. Depending upon the length of the tilting lever 16 as well as the location of bore 17 and lug 18, the outboard engine 8 is tilted upwards preferably by an angle of between 45° and almost 90°. The angle between shaft 7 and support arm 6 in this case is between 135° and 180° in the upward-tilted position.

Figure 2:
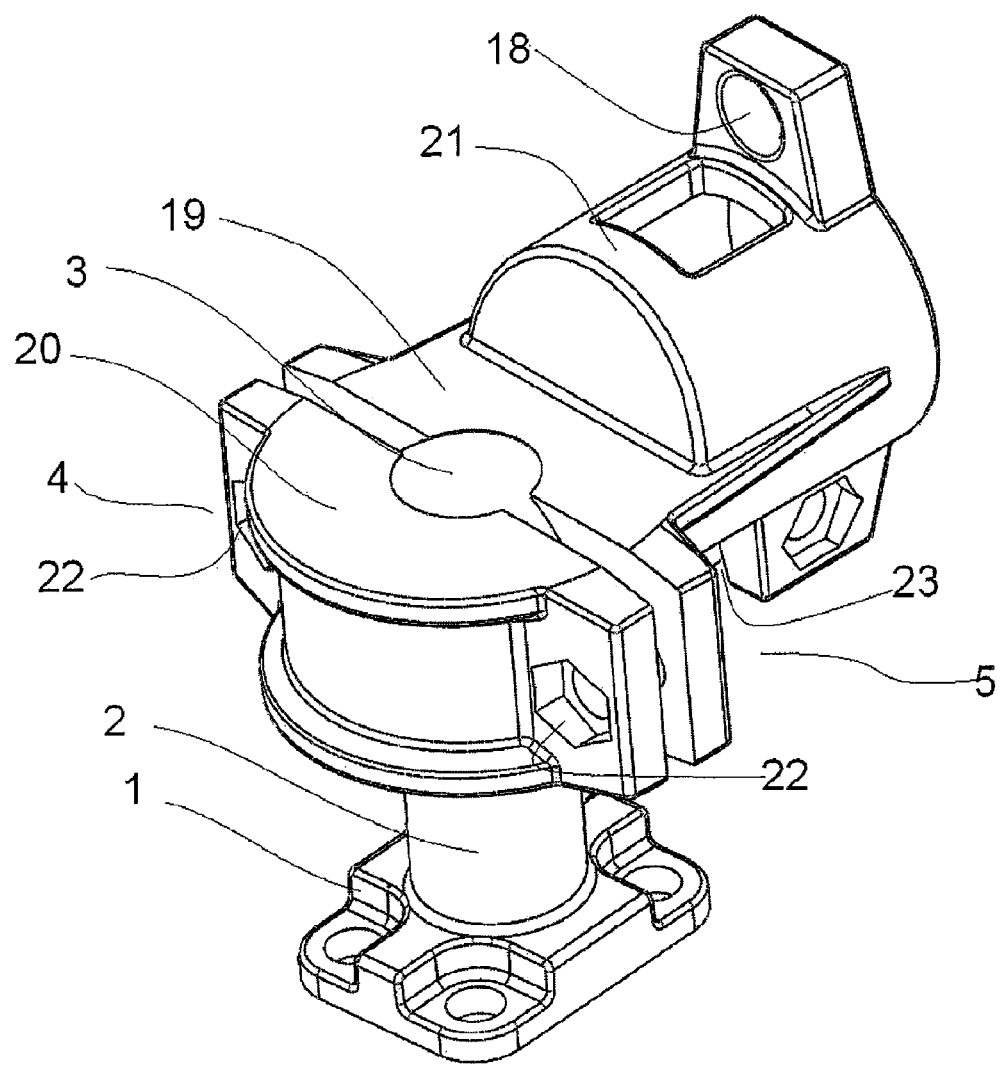
FIG. 2 is a more detailed perspective view of the ball joint of the mounting according to FIG. 1.

FIG. 2 is a more detailed showing of the fastening of the support arm 6 on the boat according to the invention. A carrier plate 1 is screwed fast on top of the kayak. Holes have been drilled into the top of the kayak for this purpose into which spreading dowels made from metal are inserted. The carrier plate 1 is placed on the bores. An O-ring or some other seal is placed between the carrier plate 1 and the deck of the kayak to effect sealing. Screws are inserted into the bores and screwed into the spreading dowels. As the screws are tightened further, the spreading dowels are prized open on that side of the kayak top which lies opposite carrier plate 1, thus clamping the kayak top between carrier plate 1 and spreading dowels. Connected to the carrier plate 1 is a short distance piece or spacer 2, at the end of which sphere 3 is attached is seen in FIG. 4.

The clamping device 4 essentially consists of a first bearing shell 19 and a second bearing shell 20, of which the first bearing shell 19 is provided with a holder 21 for the support arm 6. The insides of the first and second bearing shells 19, 20 are hemispherically arched inwards, whereby the radius substantially corresponds to the radius of the sphere 3 attached to the kayak.

To fasten the support arm 6, the two bearing shells 19, 20 are placed around the sphere 3 and connected to each other by screws (not shown). The screws are inserted through openings 22, two of which are shown in FIG. 2. In a currently specially preferred embodiment, four bores 22 are provided. On each side of the sphere 3, two bores 22 are provided in this case in a direction parallel to the longitudinal axis of the distance or spacer piece 2. This variant has the advantage that a more even pressure can be exerted upon sphere 3 by the bearing shells 19, 20. If only one bore 22 is provided on each side as shown in FIG. 2, and if this one is not exactly at the height of the equator of sphere 3, there is the possibility that different forces act upon the upper and lower half of sphere 3 when tightening the screws, thereby possibly failing to achieve an optimal fixing of sphere 3 between the bearing shells 19, 20.

In both variants, the bearing shells 19, 20 and the sphere 3 form a ball joint 5 which is fixed by tightening the screws. The bearing shells 19, 20 are pressed against each other, thereby establishing a non-positive connection with sphere 3.

The first bearing shell 19 further comprises a holder 21 in the form of a pipe clamp, namely a pipe piece with an elongated slot 23. The support arm 6 is inserted into the pipe piece 21. Fixing of the support arm 6 in the holder 21 is effected by squeezing the pipe piece 21 by a screw-and-nut-connection. But it is also contemplated to effect a fixed, i.e. a non-detachable, connection of the support arm 6 with the ball joint 5.

Depending upon the capacity of the outboard engine 8 attached to the support arm 6 and depending upon the orientation of the support arm 6 relative to the boat, a relatively large torque may be transmitted to the carrier plate 1 via the support arm 6 and the ball joint 3. In a currently preferred embodiment therefore, an extension arm 24 is provided which is attached to the distance piece 2 carrying the sphere 3 via a kind of pipe clamp 25. The extension arm 24 is shown in detail in FIG. 3. At its end provided with the pipe clamp 25, the extension arm 24 comprises a further joint 26, which together with the pipe clamp 25 forms a universal joint 27 so that the extension arm 24 is movable about two axes perpendicular to each other in relation to the distance piece 2.

Figure 3:
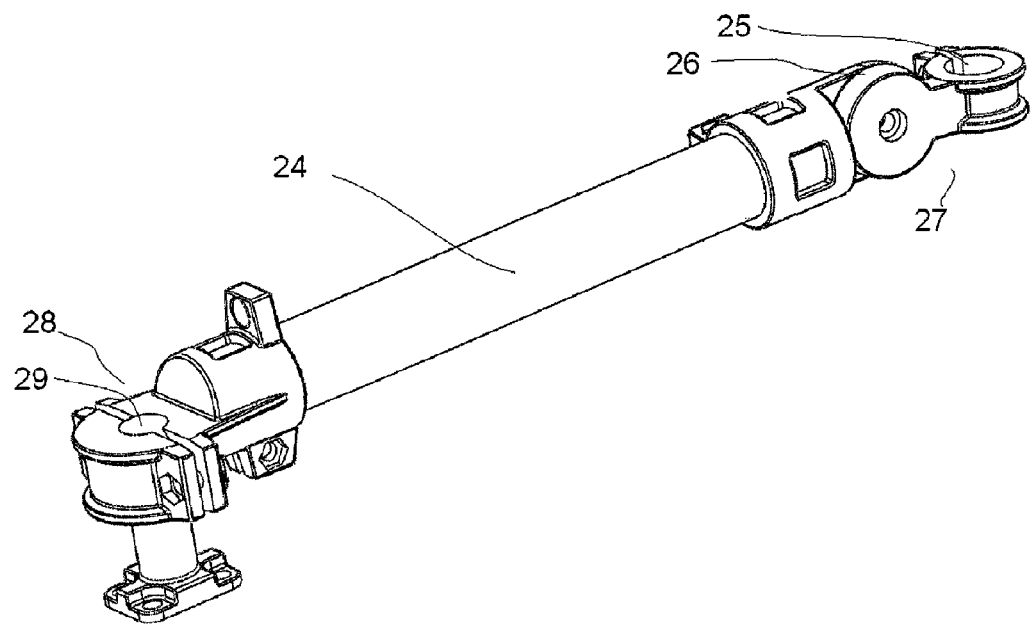
FIG. 3 is a perspective view of an extension arm for the mounting according to the present invention.

At the opposite end the extension arm 24 has a fastening device with which it can be fixed on the kayak at another point. FIG. 3 shows a sphere clamping device 28 corresponding to the ball joint 5 shown in FIGS. 1 and 2. The sphere clamping device 28 is connected with a second sphere 29 attached to the kayak.

It is, however, also contemplated, to provide other fastening variants instead of the ball joint consisting of sphere clamping device 28 and sphere 29. The essential concept is that the torque is no longer absorbed exclusively by the sphere 3 or the carrier plate 1 but also, via the extension arm 24, by the second fixed point, for example a second sphere 29. The mechanical stress upon the carrier plate 1 and upon its fastening on the kayak is thus distinctly reduced.

FIG. 5 shows a kayak 31 according to the invention with outboard engine 32. The shaft of the outboard engine 32 is, as already described above, fastened via a fastening element 33 on a support arm 34 which in turn is connected via a ball joint 35 with the kayak.

A plastic or hard rubber element 36 is provided on top of the kayak 31. The plastic or hard rubber element 36 may, for example, be glued or screwed into the top of the kayak. Further bearing elements 37 may be attached to the plastic or hard rubber element 36 in such a way that the height of the bearing formed by the plastic or hard rubber element 36 and the bearing elements 37 can be adjusted. The height of the bearing is adapted to the orientation of the support arm 34 and the shape of the hull, so that the support arm 34 comes to rest on the bearing 37 and is supported by the same. The support arm 34 may be fixed to the bearing 37 by a restraining device 38. The plastic or hard rubber element 36 or the bearing 37 are arranged as closely as possible to the edge of the hull of the kayak, in particular as far as possible at the rear, so that the torque exerted by the support arm 34 is optimally absorbed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A boat having a mounting for fastening an outboard engine on the boat, wherein the mounting comprises a support arm having a first fastening element for fastening the support arm on the boat, and a knob provided on the boat such that the first fastening element acts as a clamping device for receiving and fixing the knob, wherein the support arm comprises a second fastening element spaced apart from the first fastening element for fastening a shaft of the outboard engine on the support arm, and wherein the second fastening element comprises two rotary joints with respective rotary axes offset by 90° relative to each other.

2. A boat having a mounting for fastening an outboard engine on the boat, wherein the mounting comprises a support arm having a first fastening element for fastening the support arm on the boat, and a knob provided on the boat such that the first fastening element acts as a clamping device and, together with the knob, forms a ball joint, wherein the clamping device comprises a first and a second bearing shell, and the first bearing shell is connectable to the support arm.

3. A boat having a mounting for fastening an outboard engine on the boat, wherein the mounting comprises a support arm having a first fastening element for fastening the support arm on the boat, and a knob provided on the boat such that the first fastening element acts as a clamping device for receiving and fixing the knob, wherein the clamping device comprises a first bearing shell and a second bearing shell, and the first bearing shell is connectable to the support arm, and wherein the second bearing shell is detachably connected to the first bearing shell.

* * * * *